United States Patent [19]

Kapgan

[11] Patent Number: 4,832,382
[45] Date of Patent: May 23, 1989

[54] COUPLING DEVICE

[75] Inventor: Michael Kapgan, Foster City, Calif.

[73] Assignee: Raychem Corporation, Menlo Park, Calif.

[21] Appl. No.: 148,733

[22] Filed: Jan. 25, 1988

Related U.S. Application Data

[63] Continuation-in-part of Ser. No. 12,261, Feb. 19, 1987, abandoned.

[51] Int. Cl.⁴ .............................................. F16L 13/14
[52] U.S. Cl. ..................................... 285/369; 285/381; 285/382.2; 174/DIG. 8
[58] Field of Search ................. 285/21, 369, 381, 382, 285/382.1, 382.2, 382.7, 909, 916; 156/294, 304.2, 303.1, 274.1, 86; 174/DIG. 8

[56] References Cited

U.S. PATENT DOCUMENTS

| | | | |
|---|---|---|---|
| 3,174,851 | 3/1965 | Buehler et al. | 75/170 |
| 3,351,463 | 11/1967 | Rozner et al. | 75/170 |
| 3,477,750 | 11/1969 | Powell | 285/382 X |
| 3,753,700 | 8/1973 | Harrison et al. | 75/175.5 |
| 3,783,037 | 1/1974 | Brook et al. | 148/11.5 |
| 4,135,743 | 1/1979 | Hughes | 285/155 |
| 4,144,104 | 3/1979 | Brook | 148/11.5 |
| 4,198,081 | 4/1980 | Harrison et al. | 285/381 |
| 4,283,079 | 8/1981 | Flaherty | 285/381 |
| 4,296,955 | 10/1981 | Martin | 285/381 |
| 4,379,575 | 6/1983 | Martin | 285/369 |
| 4,424,411 | 1/1984 | Clabburn | 285/381 X |
| 4,434,320 | 2/1984 | Klein et al. | 285/381 X |
| 4,455,041 | 6/1984 | Martin | 285/369 |
| 4,469,357 | 9/1984 | Martin | 285/381 |

FOREIGN PATENT DOCUMENTS

| | | | |
|---|---|---|---|
| 2039654 | 8/1980 | Greece | 285/381 |
| 1580036 | 11/1980 | United Kingdom . | |
| 2076489 | 12/1981 | United Kingdom . | |

Primary Examiner—Thomas F. Callaghan
Assistant Examiner—Anthony Knight
Attorney, Agent, or Firm—Simon J. Belcher; Herbert G. Burkard

[57] ABSTRACT

A device for coupling to an object such as a pipe, particularly for joining pipes together, comprising a tubular sleeve of which at least one end portion has positioned on it a collar of dimensionally heat-recoverable polymeric material, and a shape memory alloy driver. Recovery of the driver is arranged to deform one or both of the sleeve and the object into contact with one another. Recovery of the collar is arranged to fill at least partially the radial space between the sleeve and the object so as to provide relief from transverse strain imposed on the joint between the object and the device.

10 Claims, 3 Drawing Sheets

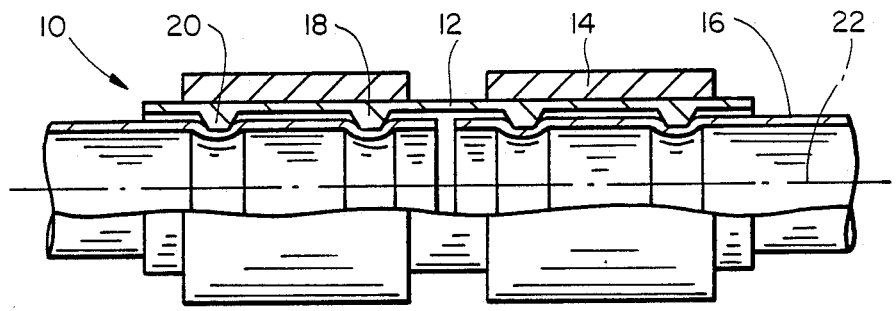
FIG_1
(PRIOR ART)
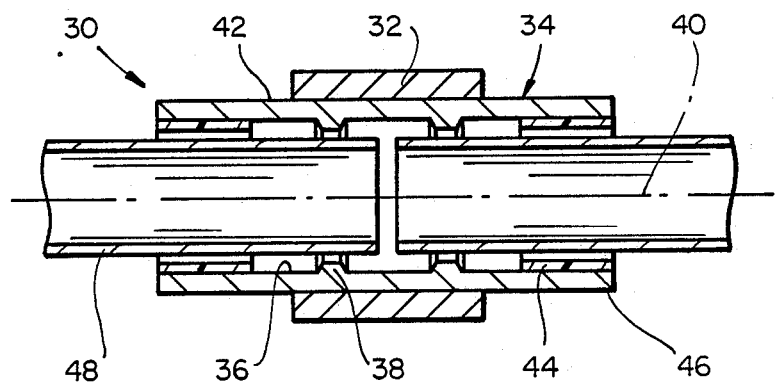
FIG_2A
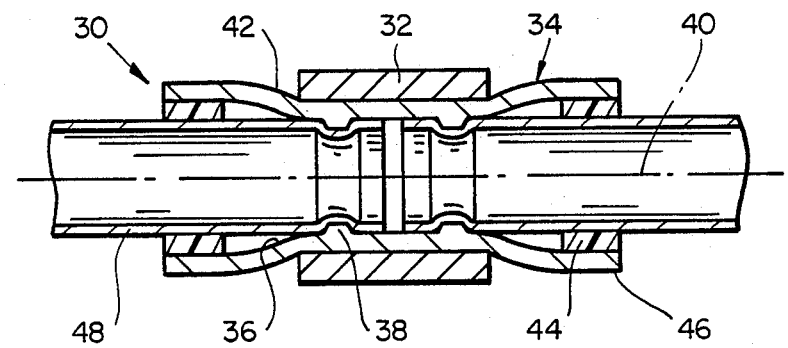
FIG_2B

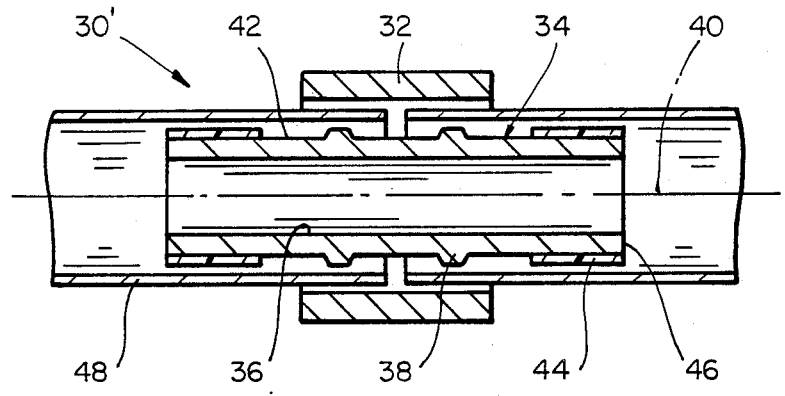
FIG_3A
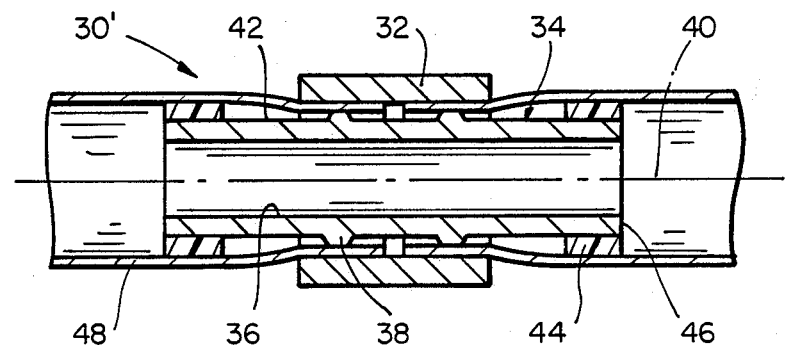
FIG_3B
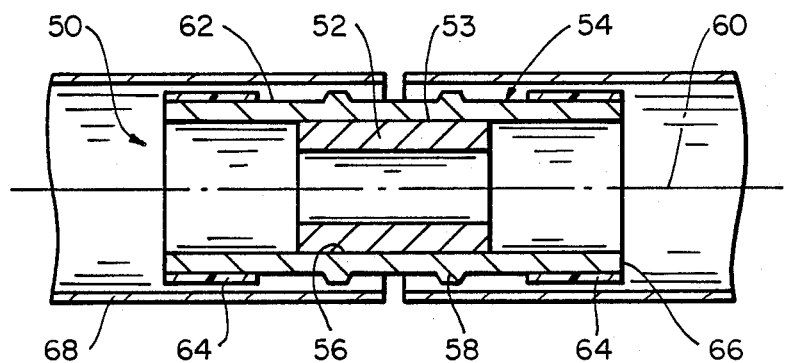
FIG_4A

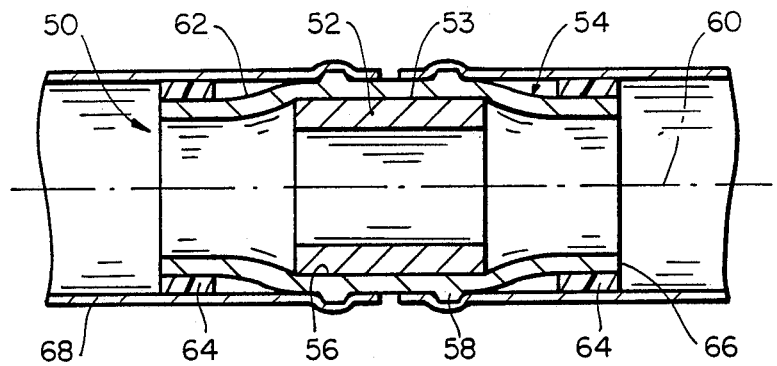
FIG_4B
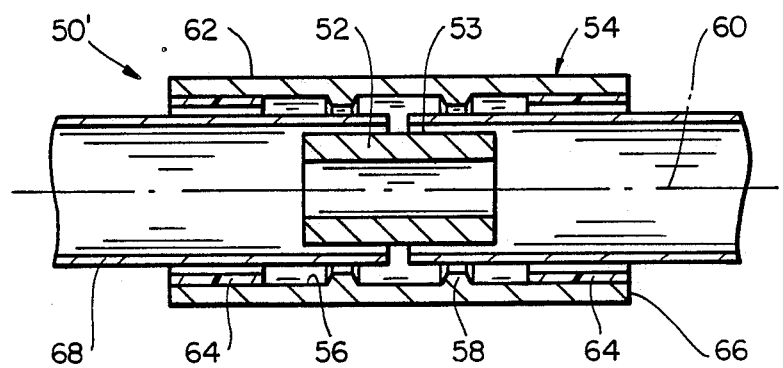
FIG_5A
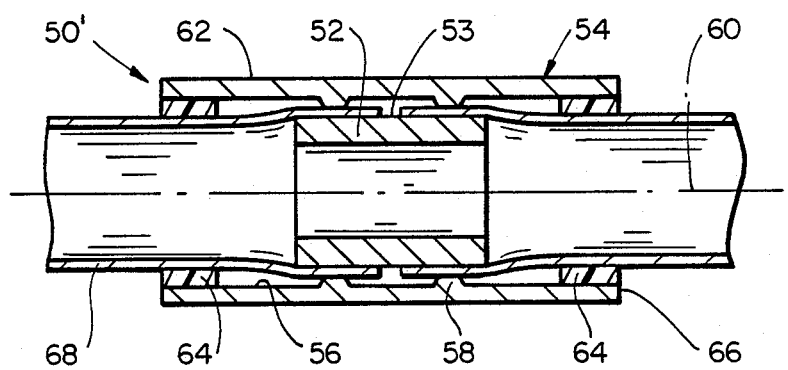
FIG_5B

COUPLING DEVICE

CROSS-REFERENCE TO RELATED APPLICATIONS

This application is a continuation-in-part of commonly assigned copending application Ser. No. 012,261 filed 2/19/87 now abandoned, the disclosure of which is incorporated herein by this reference thereto.

BACKGROUND OF THE INVENTION

This invention relates to a device for coupling to an object such as a pipe or a rod. For example the device may be used to couple two or more pipes.

U.S. Pat. No. 4469357 discloses a composite coupling for joining cylindrical substrates, which comprises a tubular heat-recoverable metallic compression sleeve and a tubular metallic insert disposed in the direction of recovery of the sleeve so that when the sleeve recovers, it deforms the insert so that it contacts the substrates to be joined.

It is desirable to minimize the amount of shape memory alloy used to make a coupling of the type disclosed in U.S. Pat. No. 4469357, because of the significant expense associated with such materials, both in terms of materials per se and of processing.

SUMMARY OF THE INVENTION

The present invention provides a device for coupling to an object, comprising:
(a) a tubular sleeve;
(b) a shape memory alloy driver for deforming at least one of a portion of the sleeve remote from one end thereof, and an object to which the device is to be coupled, into contact with one another;
(c) a collar of a dimensionally heat-recoverable polymeric material located on a principal surface of the sleeve towards the said end thereof, the collar expanding radially when heated so as to reduce the radial space between the collar and an object to which the device is to be coupled.

In the device of the invention, the function of providing a seal or tensile strength or both between the coupling and the object is separated from the function of providing relief from transverse strain. The seal or tensile strength in the joint is provided by the shape memory alloy driver, while strain relief is provided by the collar of polymeric material. This separation of functions has the significant advantage that the amount of shape memory alloy required in the device can be reduced while not reducing the relief from transverse strain to an unacceptable degree. Indeed, the driver can be arranged specifically so that it provides the necessary seal or tensile strength characteristics for a particular application; the amount of material for the driver will generally be less than would be necessary if it were also required to provide strain relief for the joint between the coupling and the object.

The use of a collar of dimensionally heat-recoverable polymeric material to provide strain relief for the joint has the advantage of ease of installation, as is known of recoverable materials in general. According to the present invention, however, particular recoverable materials are selected for particular components of the coupling device. The shape memory alloy driver, which deforms one or both of a portion of the sleeve and the object into contact with one another, allows high recovery forces to be generated, so as to make a fluid tight joint if required. A collar of polymeric material is used to provide strain relief.

By appropriate selection of the material of the collar, and of its configuration and processing, the amount of strain relief that it is able to provide can be selected according to the requirements of a particular application. The collar provides strain relief by in effect filling, at least partially, the radial space between the sleeve and the object over a certain length. The amount of strain relief provided by the collar can be adjusted for example by selecting a material of suitable compressibility, or by selecting the axial and transverse dimensions of the collar. The use of a polymeric material for the collar has the advantage that the physical properties of the collar can be adjusted more conveniently than is possible with a shape memory alloy component because of the relative ease with which polymeric components can be manufactured compared with metallic components. This is particularly advantageous for the collar since it allows the amount of strain relief imparted to a joint made by means of the present coupling to be selected according to requirements.

The provision of strain relief by the device of the invention is particularly advantageous when the sleeve bears, on one of its principal surfaces, at least one radial tooth which extends circumferentially about the longitudinal axis of the sleeve. Such a tooth is preferably provided on the portion of the sleeve that is remote from the end towards which the collar is located. Such a tooth may be relied on to enhance the tensile strength of the joint between the device and an object, or to enhance the seal between the device and the object, or both, by being forced into the surface of the object by the shape memory alloy driver when it recovers. When the sleeve bears such a tooth, strain imparted to the joint between the device and the object can be concentrated on the tooth. This can be undesirable since it can lead to a reduction in the tensile strength of the joint or a weakening of the seal between the device and the object or both. These undesirable effects are mitigated by the device of the present invention which provides relief against strain applied to a tooth on the sleeve of the device.

Preferably, both the driver and the collar are located on, preferably in contact with, principal surfaces of the sleeve. For example, when the driver is shrinkable, it will be located on the external surface of the sleeve and an object to which the coupling is to be joined will be received within the sleeve, so that when the driver recovers, it deforms the sleeve into contact with the object.

In other embodiments the driver and the collar can be on the same principal surface of the sleeve, but in this case the object to be joined will be interposed between the sleeve and the driver, and will be deformed by the driver, as it recovers, into contact with the sleeve.

While the sleeve is generally referred to as being tubular, it should be understood that the word "tubular" is not limited to right cylindrical hollow sleeves but also includes other sleeves such as those which are Y-shaped, T-shaped and X-shaped.

Preferably, the sleeve has more than one end and has a collar of dimensionally heat-recoverable polymeric material located on a principal surface towards more than one, preferably each of the ends. For example, when the sleeve is a right cylindrical hollow sleeve, it is preferred that a collar is provided towards each end.

When the sleeve has three or more ends, for example by being Y-shaped, T-shaped or X-shaped, one or more, preferably each, of the ends of the sleeve has a collar located on a principal surface. Such a device can be used to provide a strain relieved joint between as many objects as the sleeve has ends.

The recoverable components of the device may be expansible or shrinkable.

The object to which the device of the invention may be coupled may be solid or hollow when the recoverable components of the device are radially shrinkable. For example they may be pipes, rods, bars or cables. When the device is such that the collar is located on the external principal surface of the sleeve, the objects to be coupled will be hollow so that the sleeve can be positioned within it, and so that the collar recovers into contact with the internal surface of the object when heated.

The device may be used to couple like objects together, or it may be used to couple different objects. For example, it may be used to terminate a pipe, for example to couple it to a pump or another piece of equipment. It may form a part of a screw fitting, serving to attach a circumferential flange (which can form part of the sleeve) to an object which is engaged by a threaded collar for attachment to an appropriately threaded mateable collar.

The driver may comprise one or more elements, each comprising shape memory alloy material. For simplicity of assembly, it is preferred to use a one piece driver having a configuration which is appropriate to the number of objects to be connected and to the configuration of the sleeve. It can in some circumstances be advantageous to use a plurality of ring-like driver elements, each serving to deform a respective portion of the sleeve. This is particularly advantageous when the sleeve is other than a right cylindrical hollow sleeve. Preferably, a ring driver is arranged to recover to compress the sleeve at a point at which a tooth is provided on one or both of its principal surfaces.

The alloy used to form the driver will be selected according to certain desired properties such as the recovery temperature, the conditions likely to be encountered in use, and the material and physical characteristics of the liner. Suitable shape memory alloys are disclosed in U.S. Pat. No. 3174851, U.S. Pat. No. 3351463, U.S. Pat. No. 3753700, U.S. Pat. No. 3783037, U.S. Pat. No. 4144104 and EP-A-185452.

Suitable materials for the collar of the device will be selected according to certain desired properties such as the force desired to be exerted by the collar when it recovers, the recovery temperature, and the conditions likely to be encountered in use. Particularly preferred materials for the collar include high molecular weight polyethylenes having a molecular weight of at least about 150,000, for example from about 150,000 to about 600,000, preferably from 200,000 to about 400,000. A particularly preferred material for the collar comprises sintered ultra high molecular weight polyethylene (UHMWPE) having a molecular weight of at least about $1.5 \times 10^6$, preferably from about $2 \times 10^6$ to about $4 \times 10^6$, for example at least about $3 \times 10^6$. Such a material is disclosed in EP-A-153199 and conductive articles made from UHMWPE are disclosed in EP-A-157640.

The sleeve is preferably formed from a metal. It is particularly preferred that the metal is one which is gall-prone as discussed in U.S. Pat. No. 4469357.

BRIEF DESCRIPTION OF THE DRAWINGS

FIG. 1 is an elevational view, partly in cross-section, of a prior art composite device, after recovery; and FIGS. 2 to 5 are sectional elevational views of four embodiments of the device according to the invention, each device being shown before and after recovery in parts (a) and (b) respectively of each of the Figures.

DESCRIPTION OF PREFERRED EMBODIMENTS

Referring to the drawings, FIG. 1 shows a composite device of the type disclosed in U.S. Pat. No. 4469357 which comprises a pair of heat-recoverable shape memory alloy drivers 14 and a tubular sleeve 12 which has a plurality of radial teeth 18,20 circumferentially formed about the longitudinal axis 22 of the sleeve.

In use, objects such as pipes 16 are inserted into the sleeve 12. The temperature of the drivers 14 is then raised above their transformation temperature to cause them to recover so that they compress the sleeve 12 radially and force the teeth 18,20 to bite into the external surface of the pipes 16. The teeth thus serve to retain the pipes within the sleeve, and to enhance the seal between the pipes and the sleeve.

FIGS. 2 to 5 show devices according to the present invention.

FIG. 2 shows device 30 which comprises a shape memory alloy driver 32 consisting of a pair of rings and a tubular metallic sleeve 34. The interior surface 36 of the sleeve bears radial teeth 38 circumferentially formed about the longitudinal axis 40 of the sleeve. Two collars 44 of a dimensionally heat-recoverable polymeric material are located on the interior surface 36 of the sleeve 34, each adjacent to a respective end thereof.

In use, objects such as pipes 48 are inserted into the sleeve 34 and the device is heated above the respective recovery temperatures of the driver 32 and the collar 44. Recovery of the rings of the driver member causes the sleeve 34 to be deformed so that the teeth 38 bite into the external surface of the pipes. Recovery of the collar causes them to expand radially so that the radial spaces between the sleeve 34 and the pipes to be filled, preferably so that the collars engage the pipe. The collars may serve also to provide a seal between the device and the object to which the coupling is joined. A coating on the collars of a sealing material such as a sealant or an adhesive may be provided for this purpose.

The coupling is shown before recovery in FIG. 2A and after recovery in FIG. 2B.

FIG. 3 shows a device 30' which comprises a driver 32 and a sleeve 34. The external surface 42 of the sleeve bears radial teeth 38 circumferentially formed about the longitudinal axis of the sleeve. The interior surface 36 is devoid of such teeth. The external surface of the sleeve also bears two collars 44,46 of a heat-recoverable polymeric material adjacent to respective ends of the sleeve.

The ends of pipes 48, having the sleeve 34 inserted within, are deformed by the driver 32 as it recovers into contact with the external surface 42 of the sleeve, so that the teeth 38 bite into the internal surfaces of the pipes.

The coupling is shown before recovery in FIG. 3A, and after recovery in FIG. 3B.

FIG. 4 shows a device 50 which comprises a driver 52 and a tubular sleeve 54. The external surface 62 of the sleeve bears radial teeth 58 which are circumferentially formed about the longitudinal axis 60 of the sleeve. The internal surface 56 of the sleeve is devoid of such teeth. Collars 64,66 of polymeric material are located on the external surface 62 of the sleeve.

In use, the device is inserted in the ends of pipes 68 and is heated to cause the driver 52 and the collars 64,66 to recover. The driver recovers outwardly, deforming the sleeve 54 so that the teeth 58 bite into the internal surface of the pipes. The collars swell radially so as to fill the space between the pipes and the sleeve.

The coupling is shown before recovery in FIG. 4A, and after recovery in FIG. 4B.

FIG. 5 shows a device 50' which comprises a driver 52 and a tubular sleeve 54. The internal surface 56 of the sleeve bears radial teeth 58 circumferentially formed about the longitudinal axis 60 of the sleeve. The external surface 62 of the sleeve is devoid of such teeth. Collars 64,66 are located on the interior surface of the sleeve.

In use, pipes 68 are interposed between the sleeve 54 and the driver 52. The device is heated to cause the driver and collars 64,66 to recover so that the driver deforms the ends of the pipes into contact with the internal surface of the sleeve, the teeth 58 biting into the external surface of the pipes. The collars expand radially on recovery so as to fill the space between the sleeve and the pipes.

The coupling is shown before recovery in FIG. 5A, and after recovery in FIG. 5B.

What is claimed is:

1. A device for coupling to an object, comprising:
   (a) a tubular sleeve;
   (b) a shape memory alloy driver for deforming at least one of a portion of the sleeve remote from one end thereof, and an object to which the device is to be coupled, into contact with one another;
   (c) a collar of a dimensionally heat-recoverable polymeric material located on a principal surface of the sleeve towards the said end thereof, the collar expanding radially when heated so as to reduce the radial space between the collar and an object to which the device is to be coupled.

2. A device as claimed in claim 1, in which the driver and the collar are located on opposite principal surfaces of the sleeve.

3. A device as claimed in claim 1, in which the principal surface, on which the collar is located, bears at least one radial tooth which extends circumferentially about the longitudinal axis of the sleeve.

4. A device as claimed in claim 3, in which the tooth is provided on the said portion of the sleeve that is remote from the end towards which the collar is located.

5. A device as claimed in claim 3, in which there are a plurality of such teeth.

6. A device as claimed in claim 5, in which the shape memory alloy driver comprises a plurality of rings, each arranged to deform the sleeve or the object into contact with one another as aforesaid in the vicinity of each of the teeth.

7. A device as claimed in claim 1, which has a collar of a dimensionally heat-recoverable polymeric material located on a principal surface of the sleeve towards each of a plurality of ends thereof.

8. A device as claimed in claim 1, in which the collar comprises an ultra high molecular weight polyethylene.

9. A device as claimed in claim 1, in which the sleeve is formed of a metal.

10. A device as claimed in claim 9, in which the metal is gall-prone.

* * * * *